J. E. BOYLE.
VALVES FOR WATER CLOSETS, &c.
No. 193,800. Patented Aug. 7, 1877.
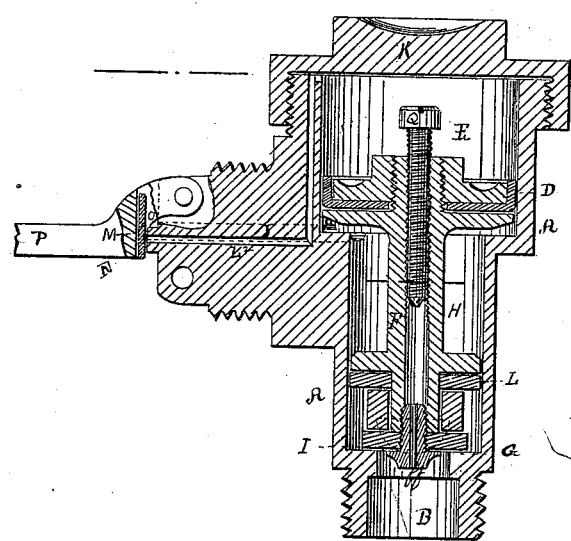
Fig: 1.
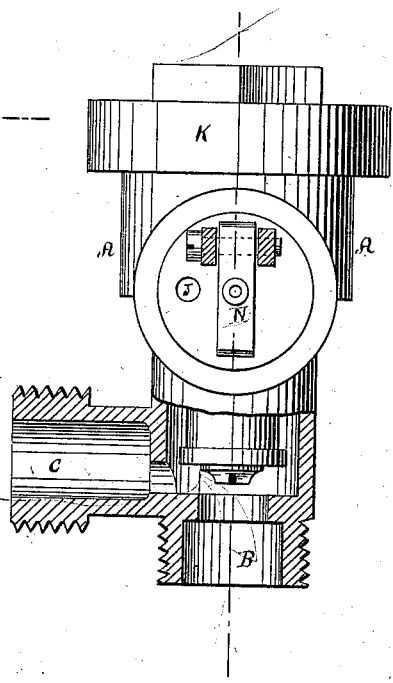
Fig: 2.
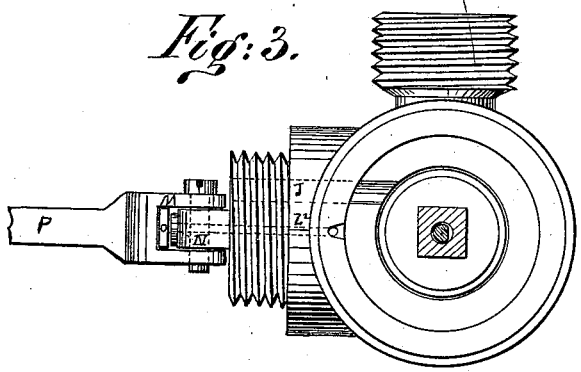
Fig: 3.
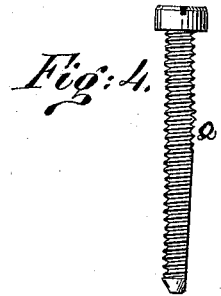
Fig: 4.
Witnesses:
Jno. Stevenson
Geo. Stevenson
Inventor:
J. E. Boyle

UNITED STATES PATENT OFFICE.

JAMES E. BOYLE, OF BROOKLYN, NEW YORK.

IMPROVEMENT IN VALVES FOR WATER-CLOSETS, &c.

Specification forming part of Letters Patent No. 193,800, dated August 7, 1877; application filed April 27, 1877.

*To all whom it may concern:*

Be it known that I, JAMES E. BOYLE, of the city of Brooklyn, county of Kings, State of New York, have invented a new and useful Valve for Water-Closets and other Purposes; and I do hereby declare that the following is a full, clear, and exact description thereof, reference being had to the accompanying drawings, making part of this specification, in which—

Figure 1 is a sectional view of the valve. Fig. 2 is a longitudinal view of the valve, showing the trip-valve attached. Fig. 3 is a vertical view of the valve and the trip-valve, and Fig. 4 is a view of the set-screw Q.

My invention relates to an improvement in cocks or valves for supplying water to hopper-closets, water-closets, and other pans and purposes, by means of which the quantity of water delivered to the pan or closet will always be the same, whatever may be the pressure or head of water from which the supply is taken.

Most of the valves or cocks now in use are so constructed and arranged that the valve or cock will remain open for the supply of water to the pan or closet for a given length of time, and devices have been resorted to to increase or lessen the stroke of the valve or cock, or the feed to the variable chamber, by means of an adjustable set-screw, and consequently the time of the closing of the valve or cock, thereby adjusting the valve to the pressure; but in all these cases the quantity of water delivered to the pan or closet is invariably increased or diminished in the same proportion. These valves may, therefore, be called "time-valves," in contradistinction to my invention now to be described, and which I will call a "quantity-valve." When several of what I call "time-valves" are set side by side, and two or more are being used at the same time, the pressure is uniformly divided between them and lessened on each, and consequently the time of closing and quantity of water delivered to the vessel will be lessened, while in my valve, no such inconvenience will result—the wash or supply of water will always be the same in quantity.

By the use of my improvement any desired quantity of water will be delivered through the valve before it closes, no matter what the head or pressure of water may be, whether light or heavy.

To enable a person skilled in the art to make and use my invention, I will proceed to describe it.

A A is the outside case or body of the valve or cock. B is the induction water-way, and C is the eduction water-way. D is a piston, packed by means of a cup-leather cupped upward, fitting the diameter of the larger chamber E, and connected, by means of the stem or rod F, with the piston L and valve G. Above the valve G is a piston, L, packed in the smaller chamber H. I is the valve-seat of the valve. J is an outlet or waste from chamber H, to discharge any water that may accumulate in said chamber H from leakage around the piston L, and to break the vacuum between the two pistons. K is the cap of the valve or cock screwed to the outside of the top of the chamber E. $L^2$ is a water-way, leading from the chamber E to the trunk or waste-pipe of the closet. M is a trip-valve, having its seat at N at the outlet of the water-way $L^2$. The lever P of the trip-valve M is within the trunk of the closet, and is weighted, so as to close the trip-valve automatically.

A float may be used, instead of a weight, by reversing the hinge of the lever; but I prefer to operate the trip-valve by lifting it.

The trip-valve M is packed at O. The chamber E and chamber H are of unequal diameter, and consequently the piston D and the piston L are also unequal, and present unequal surfaces to the pressure of water. Through the stem F is a small aperture, $f f$, to admit water slowly into the chamber E and around the set-screw Q when the valve is being closed. Q is a set-screw in the top of the stem F, and loosely fitting the aperture $f f$, to regulate the stroke of the piston D.

The operation of the valve or cock is as follows: When the valve is at rest, and there is no discharge of water from the eduction-pipe C, the valve or piston G is resting on its seat I, cutting off the supply, the piston D is at the bottom of the chamber E, and the trip-valve M is closed. The chamber E is then full of water delivered to it through the aperture $f f$, and the pressure upon the larger surface of the piston D, overbalancing the pressure upon the under smaller surface of the valve G, holds the valve G firmly to its seat I. The trip-valve M being opened by the operator, the water in chamber E is instantly discharged to the trunk of the closet through the water-way L², and the piston D and the piston or valve G are forced up into their respective chambers by the pressure of the water on the lower surface of the valve G, thereby opening the water-ways for a free passage of the water from the induction-pipe B to the eduction-pipe C, and thence to the bowl of the closet. Now, on closing the trip-valve M, thereby preventing any further escape of the water from chamber E to the trunk of the closet through the passages or water-ways L², the gradual admission of the water into chamber E through the aperture $f\,f$ and around the piston D, forces piston D and valve G slowly downward in their respective chambers until valve G rests upon and is held to its seat I by the differential pressure of the water upon the two unequal surfaces of piston D and valve G, thereby closing the said valve G and cutting off the further supply of water to the bowl.

Having fully described my invention, what I claim, and desire to secure by Letters Patent, is—

1. The combination of the pistons D and G, of unequal diameters, the trip-valve M, the water-way J, and stem F, with its aperture, to insure the slow closing of the valve, substantially as described.

2. The pistons D and G, operated in chambers of unequal diameter, and from the larger of which chambers is a discharge water-way, whereby the opening and the closing of the valve shall be due to the differential pressure of the water upon the surfaces of the respective pistons.

J. E. BOYLE.

Witnesses:
GEO. STEVENSON,
JNO. STEVENSON.